United States Patent [19]
Eversole

[11] 3,856,428
[45] Dec. 24, 1974

[54] TOOL SUPPORT

[75] Inventor: William C. Eversole, Mount Zion, Ill.

[73] Assignee: The United States of America as represented by the Secretary of the Navy, Washington, D.C.

[22] Filed: Nov. 27, 1973

[21] Appl. No.: 419,337

Related U.S. Application Data

[60] Division of Ser. No. 257,051, May 25, 1972, Pat. No. 3,801,213, which is a continuation of Ser. No. 89,186, Nov. 13, 1970, abandoned.

[52] U.S. Cl. ............................... 408/240, 408/181
[51] Int. Cl. ............................................. B23b 29/02
[58] Field of Search ........ 29/96; 408/181, 153, 156, 408/185, 240, 239, 238

[56] References Cited
UNITED STATES PATENTS

| | | | |
|---|---|---|---|
| 1,287,971 | 12/1918 | Groff | 29/96 |
| 2,382,571 | 8/1945 | Kylin | 408/181 |
| 3,112,659 | 12/1963 | Klages | 408/153 |
| 3,688,366 | 9/1972 | Jones | 29/96 |

Primary Examiner—Gil Weidenfeld
Attorney, Agent, or Firm—Melvin A. Crosby

[57] ABSTRACT

A tool holder, especially for being adjustably mounted on a support member, in which a body member on one side has a pocket for receiving an insert and on the other side has a tongue especially configured for rapidly supporting the body on a support member.

5 Claims, 4 Drawing Figures

Patented Dec. 24, 1974 3,856,428

TOOL SUPPORT

RELATED APPLICATIONS

The present application is a division of U.S. Ser. No. 257,051, filed May 25, 1972, now Pat. No. 3,801,213, entitled ADJUSTABLE DOVETAIL BORING BAR, Inventor William C. Eversole, which application is a Continuation of U.S. Ser. No. 89,186, filed Nov. 13, 1970, entitled ADJUSTABLE DOVETAIL BORING BAR, Inventor William C. Eversole, now abandoned.

U.S. Ser. No. 130,190, filed Apr. 1, 1971, now U.S. Pat. No. 3,704,958, issued Dec. 5, 1972, entitled ADJUSTABLE BORING BAR, Inventors Robert S. Gulibon and James W. Heaton.

U.S. Ser. No. 277,875, filed Aug. 4, 1972, now U.S. Pat. No. 3,765,788, issued Oct. 16, 1973, entitled ADJUSTABLE DOVETAIL BORING BAR, Inventors Robert S. Gulibon and James W. Heaton, which is a Continuation of U.S. Ser. No. 89,186, now Abandoned, and U.S. Ser. No. 130,190, now Pat. No. 3,704,958.

The present invention relates to tool holders and is particularly concerned with a tool holder in the form of an adjustable head, especially a head which can be radially adjustably mounted on a support member, such as a boring bar.

Tool holders in the form of adjustable tool holders, or heads, are known but, heretofore, have been lacking in the providing of rigid support of the head on a supporting member and in precise locating of the head on the support member. For the reason that the head was not extremely rigidly supported on the support member and accurately located thereon, such tool holders have not been used widely.

With the foregoing in mind, the primary object of the present invention is the provision of a tool holder in the form of a head for receiving a cutting insert and which head can be extremely solidly supported on a support member while being accurately located thereon and also adjustable thereon.

Still another object of the present invention is the provision of a tool holder in the form of a cutting insert supporting head which permits relatively heavy cuts to be taken by a cutting insert carried by the head without any danger that the head will shift or deflect on the support member on which it is mounted.

A still further object is the provision of a tool holder in the form of a head having a pocket for receiving a cutting insert and which head can be mounted on a wide variety of support members.

BRIEF SUMMARY OF THE INVENTION

The present invention relates to a tool holder in the form of a head having on one side a pocket to receive a cutting insert while on the other side the head is provided with a support tongue. The support tongue is a dovetail having a relatively wide angle on one side and flat on the other side. The tongue is receivable in a correspondingly shaped slot in a support member and a bolt extends through the support member and also through a hole in the tongue and clamps the head fixedly to the support member while simultaneously locating the head in at least two angularly related directions on the support member.

The hole in the tongue is elongated in the direction of the length of the tongue and screw threaded adjusting means are provided to move the head in the direction of the length of the tongue. The screw threaded adjusting means can take the form, for example, of a screw threaded into the tongue from one end and engageable with the clamp screw.

The objects referred to above and the several advantages of the present invention will become more apparent upon reference to the following detailed specification taken in connection with the accompanying drawings in which.

DETAILED DESCRIPTION OF THE INVENTION

Figure 1:
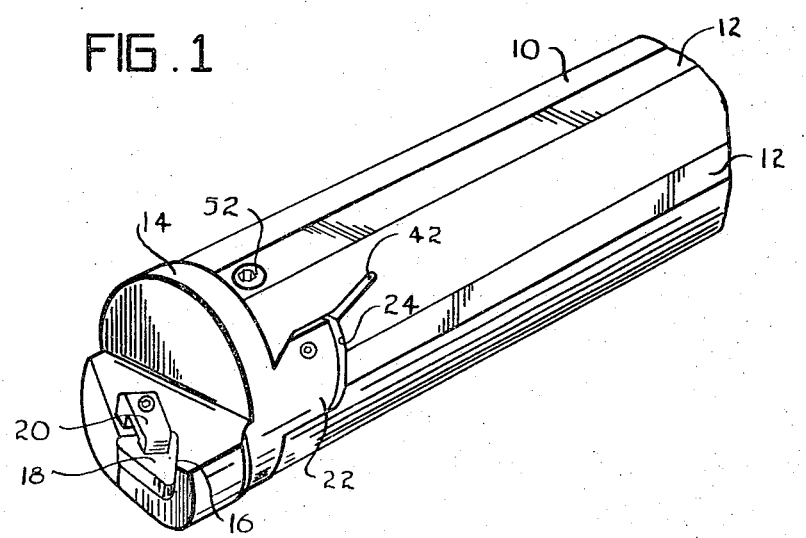
FIG. 1 is a perspective view showing a tool holder according to the present invention in the form of a head having a pocket to receive a cutting insert and with the head mounted on the end of a boring bar.

Referring to the drawings somewhat more in detail, a support member in the form of a boring bar is illustrated which comprises a shank 10. The shank 10 is an elongated, generally cylindrical, member adapted for being clamped in a suitable support therefor in a machine tool. The work may rotate relative to the boring bar or the boring bar may be rotated relative to the work. The boring bar illustrated is adapted for either type of operation.

The boring bar illustrated is only one form which a support member for a head, or tool holder, according to the present invention can take. For example, a support member could take the form of an integral part of a machine tool, or a turret, or a special holder especially adapted to a particular machining situation. It will, therefore, be understood that the shank 10 described herein is merely illustrative of support members.

Shank 10 of the illustrated arrangement preferably has flats 12 formed thereon and extending longitudinally of the shank and providing convenient surfaces for nonrotatably clamping the shank fixedly to the support therefor.

At the one end, shank 10 carries a steel head 14, according to the present invention, and which head has a pocket 16 in which a cutting insert 18 is clamped as by a top clamp member 20.

The head 14 on the side thereof facing the shank 10 is formed to present a flat surface 46 to the adjacent end of the shank and is provided with a rearwardly protruding lateral, or diametrally extending extension, or tongue, 22 adapted for being slidably received in a lateral, or diametrally extending slot, or groove, 24 in the adjacent end of shank 10.

Tongue 22 advantageously has an axially extending planar side wall 26, a bottom wall 28 and a side wall on the side opposite side wall 26 which comprises an axial portion 30 and an inclined portion 32. Inclined portion 32 is disposed between axial portion 30 and flat surface 46 on the side of the head which faces the adjacent end of the shank 10. The tongue 22 is thus in the form of a one-sided dovetail having an inclined surface on only one side wall thereof.

Shank 10 is formed to present a flat surface 44 to flat surface 46 on the opposed side of head 14. The groove 24 in shank 10, similarly to tongue 22, has a planar axial side wall 34, a diametral bottom wall 36, and a second side wall comprising the axially extending portion 38 remote from the end of the shank and the inclined front part 40 adjacent the end of the shank and which is complementary to portion 32 of the side wall of tongue 22 on the head 14.

The boring bar, furthermore, includes a slot 42 extending generally axially of the boring bar from the bottom wall of groove 24 preferably at or near the juncture of the bottom wall 36 and portion 38 of the one wall of the groove 24 in the shank 10 of the boring bar. Slot 42 could be located anywhere along the bottom wall of groove 24 but is advantageously located as shown near the juncture of the aforementioned bottom wall and the one wall portion of the groove for the reason that this location of the slot imparts the best action to the clamping up operation and likewise results in the strongest construction.

According to the present invention, the interengaging dovetail surfaces, or wall portions, 32 and 40 are inclined at an angle of about 45 degrees to the longitudinal axis of shank 10, although it will be understood that this angle could vary substantially within the purview of the present invention. The important thing about the angle of the inclined surface is that, when the assembly is clamped together, the head 14 is drawn toward the shank so the flat surface 46 on the head will firmly engage the flat surface 44 on the shank so the head will be exactly located and will be held against yielding, even under fairly high loads.

According to the present invention, the tongue 22 on the head of the boring bar is provided with a hole 48 which is elongated in the direction of the length of the tongue and groove to receive a clamp bolt 50 with clearance. Hole 48 could be in the form of a recess extending into said tongue from the rear end but is preferably in the form of a hole to keep the tongue as strong as possible.

Figure 2:
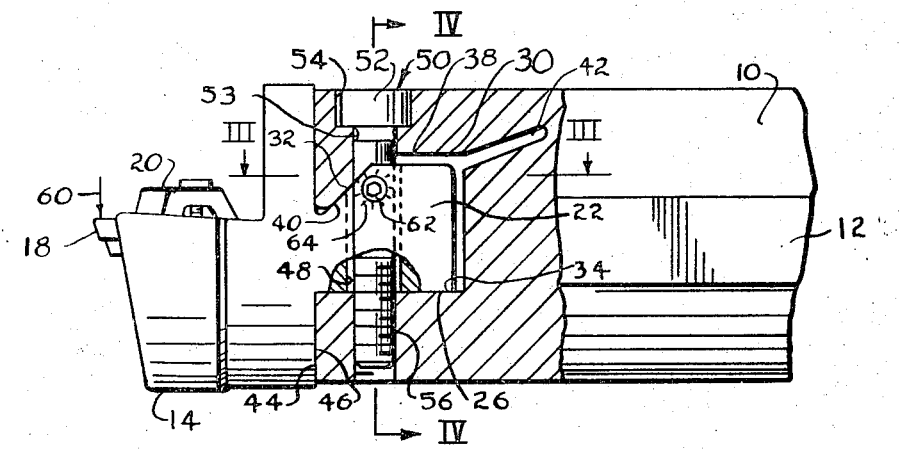
FIG. 2 is a side view of the boring bar and the head partly broken away.
Figure 4:
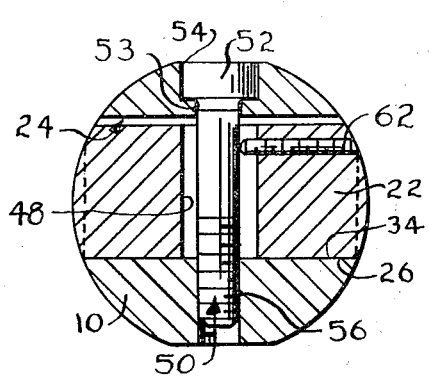
FIG. 4 is a transverse vertical sectional view indicated by line IV—IV on FIG. 2.
Figure 3:
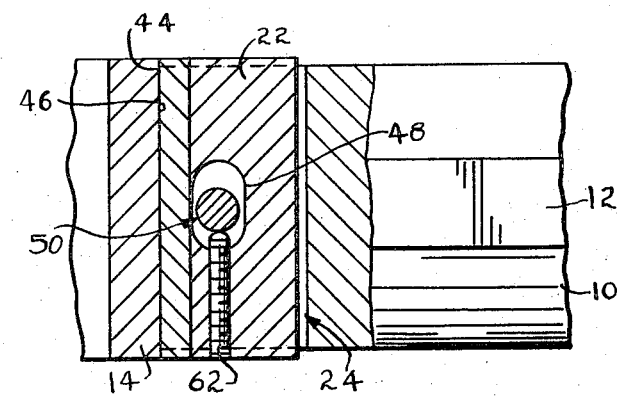
FIG. 3 is a plan sectional view indicated by line III—III on FIG. 2.

Clamp bolt 50, as will best be seen in FIGS. 2 and 4, has a head 52 receivable in a recess 54 provided therefor in the shank 10 in the region of the end of shank 10 adjacent head 14. Recess 54 is coaxial with a bore 56 in the shank which is threaded for receiving the threaded end of screw 50.

The location of screw 50 is of particular merit because it acts directly in the vicinity of the transverse plane of the inclined wall portions 32 and 40 and is thereby highly effective for drawing these surfaces tightly together, and, furthermore, for holding the surfaces in firm engagement once the screw has been tightened up.

Still further, the screw 50 passes through hole 48 with clearance and this is of particular merit because, if it should happen that the machine operator inadvertently forgets to tighten up the clamping screw, the head 14 cannot be thrown off from the shank 10 even when the boring bar is of the rotating type.

Inasmuch as the clamp screw extending through the groove and tongue also represents a safety feature, since it prevents the head from becoming disengaged from the shank, it is possible further to enhance the safety aspect of the arrangement by providing a slightly weakened region in the clamp screw adjacent the head end, as shown at 53, so that if the clamp screw should, for any reason, become stressed to the point of breaking, the fracture will occur at the weakened region of the screw thereby leaving in the shank that portion of the screw extending into the tongue on the head so that the head will be held on the shank until the machine can be brought to a halt and suitable repairs made in the boring bar, or the boring bar replaced by another.

As mentioned, the screw holds the assembly tightly clamped together and this is of importance because it permits relatively heavy cuts to be taken by a boring bar according to the present invention without the load imposed on the insert carried by the head causing any tilting of the head on shank 10.

If the screw 50 were to be located rearwardly along a shank from head 14, as is the case in respect of certain other known types of adjustable head boring bars, one thereof being shown in the U.S. Pat. No. 3,433,104, there would be sufficient resilience in the assembly to permit the head to tilt under extremely heavy loads and this is, of course, highly objectionable.

The location of slot 42 near the top of the bottom wall of the groove in the end of shank 10 is important because the lower part of the boring bar remains a solid mass of metal and is, thus, in the best possible condition to sustain any thrusts imposed on the insert carried by the cutting head.

Assuming that the principal load on the cutting insert is downwardly as indicated by arrow 60 in FIG. 2, it will be evident that the tang on the top of the boring bar formed by the notch 42 and including at its outer end the wedge shaped portion that fits in the dovetail formed on the tongue 22 of the head, will be principally in tension while the flat surfaces 44 and 46 toward the bottom of head 14 will be placed principally in compression.

The disclosed arrangement thus forms an extremely strong and solid mounting for the head 14 of the boring bar and, furthermore, eliminates the possibility of injury to the shank 10 in the case of sudden shock loading on the head as can sometimes occur during machining operations when an insert breaks or when certain other unexpected events occur.

The invention also proposes the provision of at least one adjustment screw 62 extending laterally into tongue 22 in the plane in which screw 50 is located. The region of the tongue 22 immediately surrounding the hole for screw 62 may have indicia 64 thereon so the amount of rotation of the screw and, therefore, the amount of adjustment laterally of head 14 on shank 10 can be determined.

As mentioned, shank 10, is merely exemplary of the several forms a support member can take. Any support member provided would, of course, have a groove for the tongue on the head, and means to receive the clamp screw, and a flat surface to abut the flat on the head at the base of the tongue.

The head, as an article of commerce, would advantageously include the special clamp screw and the adjustment screw and the hardware necessary for clamping a cutting insert in the pocket provided therefor on the head.

Modifications may be made within the scope of the appended claims.

What is claimed is:

1. In a head to support a cutting insert and adapted for adjustable mounting on a grooved support; a body of machinable metal and having a longitudinal axis, said body having an intermediate portion and an axially extending end portion on each side thereof, pocket means for receiving a cutting insert formed in one end portion of said body, a diametral tongue formed on said other end portion of said body and adapted for insertion into the groove of a grooved support, the side of said intermediate portion of said body from which said tongue protrudes being disposed in a flat plane perpendicular to the axis of said body, one side of said tongue being parallel to the axis of said body, the other side of said tongue comprising an inclined portion adjacent said body which diverges from the axis of said body in a direction away from said body, and a slot through said tongue on an axis perpendicular to said one side of the tongue and elongated in a direction perpendicular to the axis of said body, said slot adapted for receiving a clamp bolt for clamping the head to the grooved support.

2. A head according to claim 1 in which said other side of said tongue at the end of said inclined portion remote from said intermediate portion of said body is parallel to said one side of said tongue.

3. A head according to claim 1 in which said pocket has a substantially axially extending bottom wall on which the insert rests which is substantially parallel to said one side of said tongue and which faces away from said one side of said tongue.

4. A head according to claim 1 which includes adjusting means comprising screw threads and carried by said tongue for effecting adjustment of said body on a support in which said tongue is disposed.

5. A head according to claim 4 in which said adjusting means is within the axial range of said slots and includes a screw adapted for cooperation with a clamp bolt extending through said slot and nonmoveably carried by the support in which said tongue is disposed.

* * * * *

UNITED STATES PATENT OFFICE
CERTIFICATE OF CORRECTION

Patent No. 3,856,428            Dated December 24, 1974

Inventor(s) WILLIAM C. EVERSOLE

It is certified that error appears in the above-identified patent and that said Letters Patent are hereby corrected as shown below:

The front page, data element identifier [73]

Assignee: "The United States of America as represented by the Secretary of the Navy, Washington, D. C." should read
- -Kennametal Inc., One Lloyd Avenue, Latrobe, Pennsylvania 15 650

Signed and Sealed this seventeenth Day of February 1976

[SEAL]

Attest:

RUTH C. MASON
*Attesting Officer*

C. MARSHALL DANN
*Commissioner of Patents and Trademarks*